United States Patent [19]

Smith et al.

[11] Patent Number: 5,053,755

[45] Date of Patent: Oct. 1, 1991

[54] AUTOMOTIVE HEAD-UP DISPLAY WITH HIGH BRIGHTNESS IN DAYTIME AND HIGH CONTRAST IN NIGHTTIME

[75] Inventors: Ronald T. Smith, Redondo Beach; Mao-Jin Chern, Rancho Palos Verdes; Ronald G. Hegg, Los Angeles, all of Calif.

[73] Assignee: Hughes Aircraft Company, Los Angeles, Calif.

[21] Appl. No.: 353,851

[22] Filed: May 18, 1989

[51] Int. Cl.⁵ ............................. G09G 3/02
[52] U.S. Cl. .................... 340/705; 340/980; 353/13; 353/14; 359/13; 359/630
[58] Field of Search ............ 340/705, 980; 353/13, 353/14; 350/174, 399, 394, 407; 358/252, 253

[56] References Cited

U.S. PATENT DOCUMENTS

| | | | |
|---|---|---|---|
| 2,641,159 | 6/1953 | Mihalakis | 353/14 |
| 2,750,833 | 6/1956 | Gross | 350/174 |
| 3,230,819 | 1/1966 | Noxon | 350/174 |
| 3,915,548 | 10/1975 | Opittek et al. | 340/705 |
| 4,808,978 | 2/1989 | Vernay | 340/705 |
| 4,832,427 | 5/1989 | Nanba et al. | 350/174 |
| 4,973,139 | 11/1990 | Weinhrauch et al. | 340/705 |

FOREIGN PATENT DOCUMENTS 0286962  10/1988  European Pat. Off. ............ 340/705

Primary Examiner—Jin F. Ng
Assistant Examiner—Dov Popovici
Attorney, Agent, or Firm—Leonard A. Alkov; Wanda K. Denson-Low

[57] ABSTRACT

A head-up display having an image source for producing imaging illumination, an optical combiner for partially reflecting the imaging illumination to produce a virtual image of the image source that is viewable by the operator of the vehicle, and a polarizer which can be controllably interposed between the image source and the optical combiner for nighttime use. The polarizer tends to block the illumination that otherwise would produce objectionable ghost images.

11 Claims, 2 Drawing Sheets

AUTOMOTIVE HEAD-UP DISPLAY WITH HIGH BRIGHTNESS IN DAYTIME AND HIGH CONTRAST IN NIGHTTIME

BACKGROUND OF THE INVENTION

The disclosed invention is directed generally to head-up displays, and more particularly is directed to a head-up display which is controllable to provide high brightness during daytime and reduced ghost image intensity during nighttime.

Head-up displays are utilized in vehicles such as automobiles to produce virtual images of vehicle operating parameter indicators that appear to be ahead of the vehicle windshield and are therefore viewable by the vehicle operator without diversion of his or her eyes to an instrument panel inside the vehicle and without refocusing.

As a result of the thickness of the vehicle windshield and reflections at a glass/air interface that is not the primary reflecting surface, ghost images are produced. Depending on ambient lighting conditions and intensity relative to primary image intensity, ghost images can be objectionable.

The general requirements for head-up displays include sufficient image brightness that is not too bright, ghost image intensity that is not distractingly objectionable, and acceptable image contrast.

The foregoing general requirements for head-up displays typically require different specific characteristics for day and night use. Daytime use requires high image brightness, and permits higher ghost image intensity since the ghost images tend to blend with the ambient scene. Nighttime use requires lower primary image brightness, and lower ghost image intensity since ghost images are readily noticed against the generally dark ambient scene. While reducing imaging illumination intensity for night use provides for reducing image brightness, such reduction does not necessarily provide the sufficiently low ghost image intensity. In other words, the primary image to ghost image intensity ratio must be greater at night.

SUMMARY OF THE INVENTION

It would therefore be an advantage to provide a head-up display for vehicles that provides high brightness for daytime use and non-objectionable ghost image intensity during nighttime use.

Another advantage would be to provide a head-up display for vehicles that provides non-objectionable ghost image intensities with different ambient lighting conditions.

The foregoing and other advantages are provided by the invention in a head-up display that includes an image source for producing imaging illumination, an optical combiner comprising a beamsplitter coating for partially reflecting the imaging illumination to produce a virtual image of the image source that is viewable by the operator of the vehicle, and a polarizer which can be controllably interposed between the image source and the optical combiner. The polarizer tends to block the illumination that otherwise would produce ghost images.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
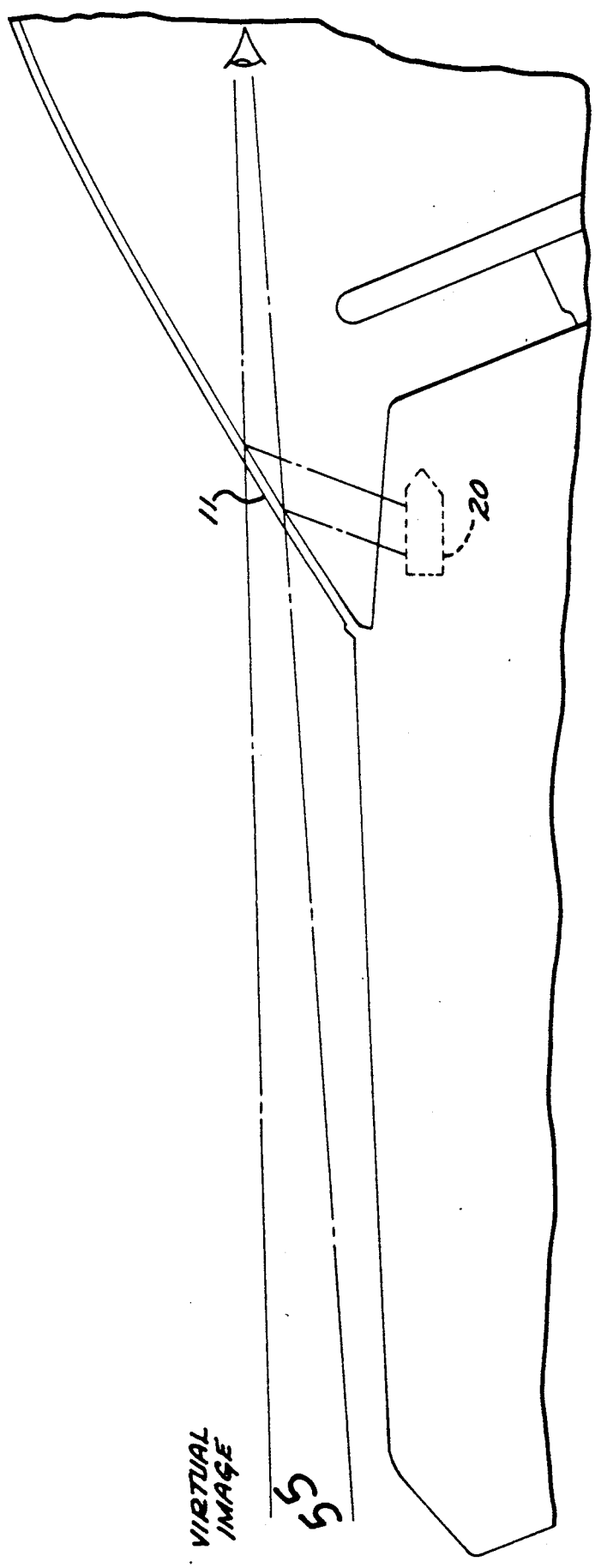
FIG. 1 is a schematic illustration of the major components of the disclosed vehicle head-up display system.

In the following detailed description and in the several figures of the drawing, like elements are identified with like reference numerals.

Referring now to FIG. 1, shown therein is a head-up vehicle instrument display system that includes an imaging illumination source 20 and a combiner element 11 that comprises a partially reflecting beamsplitter coating on the inside surface of the vehicle windshield, for example. The imaging illumination source 20 can be on the dashboard or within the dashboard with an appropriate opening for passage of the imaging illumination. The combiner element 11 partially reflects the imaging illumination toward the driver so as to produce a virtual image of a light emitting image source within the imaging illumination source 20 at a location ahead of the vehicle windshield, for example.

While the disclosed embodiments are described in the context of a vehicle such as an automobile, it should be appreciated that the term vehicle encompasses vehicles that include a windshield or similar transparent protective device, as well as vehicles that do not have windshields, in which case the combiner would be a partially reflecting coating applied to a transparent panel, for example.

By way of illustrative example, the combiner element 11 comprises a multi-layer dielectric coating or a metallic coating that does not reduce light transmission below the pertinent federal standard, presently 70%. The coating would be applied to either the inside surface of the windshield or between the layers of the windshield. As a further alternative, the reflection element 11 can be a reflection hologram.

Preferably, the imaging illumination is incident on the windshield inside surface at an incident angle that is close to the Brewster's angle for the material comprising the windshield (56 degrees relative to normal for glass in air). At the glass/air Brewster's angle, 100% of the P-polarized component of incident light passes through glass/air interfaces without reflection, while the S-polarized light is partially reflected off each glass/air interface. However, at the glass/air Brewster's angle, a hologram or coating will reflect some of the P-polarized light, the amount depending on the particular coating or hologram. A simple quarter wave stack dielectric coating or a singly-exposed volume reflection hologram is less reflective for P-polarized light than for S-polarized light, nevertheless, a good portion of the P-polarized light can be reflected. Furthermore, there are techniques well known in the art for designing dielectric coatings as to which P-reflectance at a particular incident angle is greatly improved. See for example *Optical Interference Coating Technology*, Lecture Notes, Short Course at UCLA (Engineering 823.17), Nov. 28 - Dec. 2, 1983, Philip Baumeister, instructor.

Figure 2:
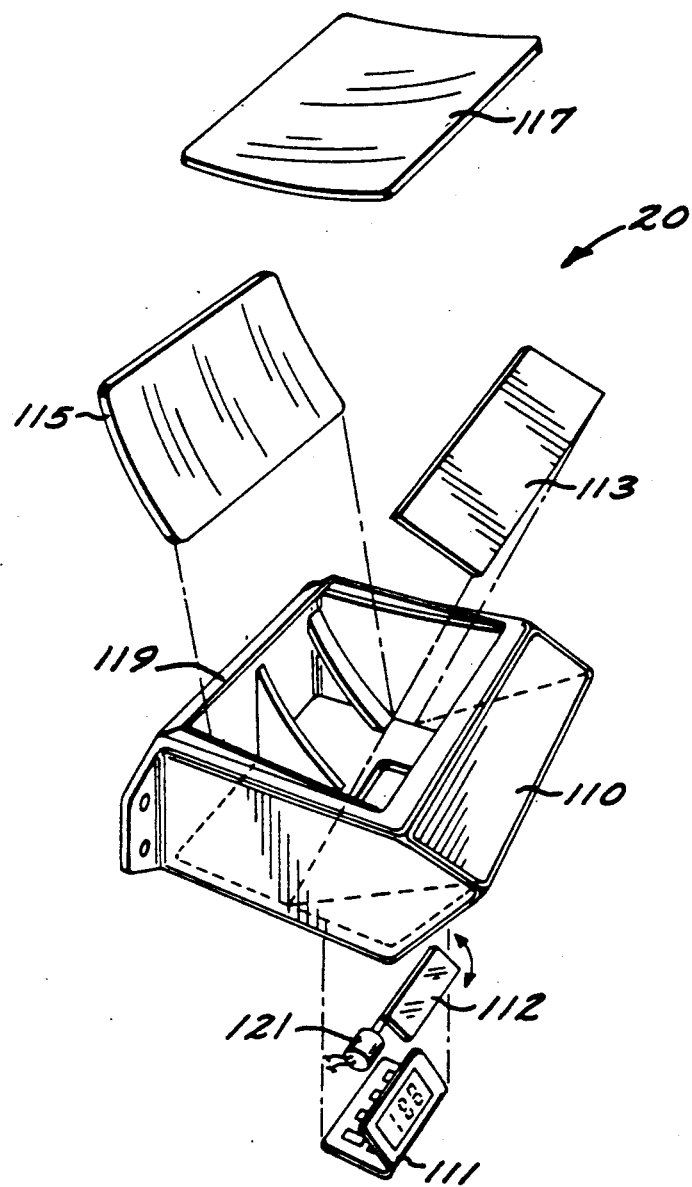
FIG. 2 is a schematic exploded view of the imaging illumination source of the head-up display system of FIG. 1.

Referring now to FIG. 2, shown therein is a detail view of the imaging illumination source 20 which includes an image source 111 comprising a high intensity vacuum fluorescent display (VFD), for example, which is secured in a housing 110. VFD's are known display devices which are commercially available, for example, from Futaba Corporation of America, Plymouth, Michigan, and commonly include segmented elements that are selectively energizable to form light emitting numerical and/or alphabetical symbols, as well as other indicia. Also, the image source 111 can be a segmented or matrix addressable liquid crystal display (LCD), which can be obtained from Seiko of Japan for example. Also, a spectrally narrow source such as light emitting diodes available from Stanley could be utilized, particularly where the combiner 11 is a hologram.

Inputs to the image source 111 are provided by appropriate transducing circuitry to display selected vehicle and/or engine operating parameters and conditions.

A movable polarizer 112 is configured to be controllably locatable in front of the image source 111, for example by a small electric motor 121, to polarize the imaging illumination when desired. As discussed more fully herein, the plane of polarization for the polarizer 112 depends on the type of combiner 11 utilized. If the image source 111 provides polarized light as the imaging illumination (an LCD, for example), it should be adapted to provide light of the same polarization as the polarizer 112.

A planar fold mirror 113 secured in the housing 110 relays the imaging illumination from the image source 111 to an off-axis, aspheric mirror 115, also secured in the housing 110, which in turn relays the imaging illumination through a transparent cover 117 to the combiner element 11. While a relay mirror is included, it should be appreciated that depending on the location of the image source 111 in the imaging illumination source 20 and the location of the imaging illumination source 20 relative to the windshield, the relay mirror might not be necessary. It should also be appreciated that with an odd number of reflecting elements (e.g., three), the image source 111 must adapted to be a mirror image of the intended virtual image. With an even number of reflecting elements (e.g., two), the image source 111 would be adapted to be oriented the same as the intended virtual image.

The aspheric mirror 115 is generally concave and magnifies the image relayed to the combiner element 11, and further functions to locate the virtual image relatively far ahead of the observer. The particular curvatures of the aspheric mirror can be defined so as to compensate for the distortion introduced by the off-axis configuration of the aspheric mirror and the distortion introduced by the curvatures of the windshield.

While an aspheric mirror 115 is included in the foregoing illustrative example, a flat mirror could be utilized if it is not necessary to locate the virtual image relatively far ahead of the observer. It should also be realized that the mirrors 113 and 115 could be eliminated by directing the image source directly at the combiner 11.

The polarizer 112 is designed to reduce the brightness of the ghost image or images relative to that of the main or primary image. For combiners which comprise a metallic or dielectric coating or a hologram, the polarizer 112 should be P-polarized. With such polarization, if the imaging illumination is incident on the combiner at or near the Brewster's angle, virtually no light is reflected off the glass/air interface or interfaces of the windshield, but there will be appreciable light reflected by the coating or hologram. Thus, the resulting image produced by the combiner will include primarily the image off the coating or hologram, and will be relatively free of ghost images.

Even if the incidence angle is significantly different from the glass/air Brewster's angle, the invention can still provide appreciable reductions in ghost image intensity relative to primary image intensity. For example, for an incidence angle of 62.5°, only about .6% of P-polarized light is reflected from a glass/air interface, while 20.6% of S-polarized light is reflected from a glass-air interface. The reflection of P-polarized light from a beamsplitter coating or hologram will likely be much greater than 0.6%.

For a combiner comprising only the inside surface of the windshield (i.e., no coating or hologram), no benefit is provided by inserting a P-polarizer in front of the image source 111, which would result in close to zero reflection of P-polarized light off each of the two glass/air interfaces and the relative brightness of the two images reflected from the outside and inside surfaces would be about equal. However, making the polarizer 112 S-polarized provides small but useful reductions in ghost image intensity relative to the primary image intensity in this case where the ghost image is off the outside glass/-air interface and the primary image is off the inside glass/air interface. The reflections at the glass/-adhesive interfaces for safety windshields are negligible since the indices of refraction are very closely matched.

The benefit of S-polarization with a combiner comprising only the inside surface of the windshield can be appreciated by consideration of the example of imaging light incident on a windshield at 70° relative to normal. The P-polarized reflection is 4.1% while the S-polarized reflection is 30.8%. In terms of incident illumination having a normalized intensity of 1, the relative intensity of the ghost image is based on the normalized values for (a) the amount of incident illumination transmitted to the outside glass/air interface, (b) the amount of illumination reflected back by the outside glass/air interface, and (c) the amount of reflected illumination transmitted at the inside glass/air interface. Assuming that normalized transmittance is (1-reflectance), and for simplicity neglecting any windshield tint, the amount of P-polarized light reflected at the outside glass/air interface and transmitted by the inside glass/air interface is $0.959 \times 0.041 \times 0.959 = 0.0377$. With the same assumptions, the amount of S-polarized light reflected at the outside glass/air interface and transmitted by the inside glass/air interface is $0.692 \times 0.308 \times 0.692 = 0.147$. If the light source is randomly polarized and no polarizer is placed in front of it, the ghost/main image ratio is $(0.0377 + 0.147)/(0.041 + 0.308) = 0.529$. If a P-polarizer is placed in front of the light source, the ghost/main image ratio is $0.0377/0.041 = 0.920$. If an S-polarizer is placed in front of the light source, the ghost/main image ratio is $0.147/0.308 = 0.477$, which is a small reduction compared to when no polarizer is in place.

The effect of the windshield tint is to reduce the ghost/main image ratio by a factor which is independent of polarization. Therefore, when using a bare windshield as a combiner, small reductions in ghost image visibility can be made with an S-polarizer, as well as significant reductions in overall image brightness.

Further as to the operation of the head-up display, the polarizer 112 is controlled to be in front of the image source during nighttime or otherwise dark ambient lighting conditions and functions to reduce the intensity of ghost images relative to the primary image intensity.

For nighttime use, the intensity of the imaging illumination provided to the combiner 11 is reduced, which is achieved by the polarizer 112 and by appropriately reducing the output of the image source 111.

While the polarizer 112 would also function to reduce the ghost image intensity relative to the primary image intensity during daytime use, the resulting primary image might not be sufficiently bright, depending on the image source 111. Ghost images during daytime use will in any event not be as objectionable due to the bright ambient scene.

The disclosed system provides the further benefit of increased contrast for an image source such as a liquid crystal display wherein the "off" portions of the display (the background of a digital display, for example) are not completely off. The resulting glow of the off areas is not noticeable during daytime use, but is noticeable during nighttime use and results in reduced image contrast. Since part of the off area leakage illumination is of a different polarization from the on areas that emit illumination of the same polarization as the polarizer 112, the off area leakage will be substantially blocked by the polarizer, resulting in increased image contrast.

The foregoing has been a disclosure of a head-up display system that provides for sufficient brightness for daytime use and non-objectionable ghost image intensity for nighttime use. The polarizer not only functions to reduce the relative ghost image intensity, but also reduces the primary image brightness, thereby providing further control over the primary image brightness for nighttime use. For liquid crystal device image sources, the disclosed invention advantageously increases image contrast for nighttime display by blocking the illumination leakage from the off areas of the image source display.

Although the foregoing has been a description and illustration of specific embodiments of the invention, various modifications and changes thereto can be made by persons skilled in the art without departing from the scope and spirit of the invention as defined by the following claims.

What is claimed is:

1. A head-up display for a vehicle, comprising:
an image source for producing imaging illumination;
an optical combiner for partially reflecting the imaging illumination to produce a virtual image of said image source viewable by an operator of the vehicle, said virtual image having a primary virtual image as well as an unwanted ghost image; and
a movable polarizer that is selectively interposed between said image source and said combiner during dark ambient light conditions for polarizing the imaging illumination provided to said combiner, whereby the primary virtual image has greater brightness relative to that of the ghost image when said polarizer is providing polarized imaging illumination as compared to when said imaging illumination is not polarized by said polarizer.

2. The head-up display of claim 1 wherein said optical combiner comprises a coating supported by a windshield.

3. The head-up display of claim 2 wherein said polarizer comprises a P-polarizer.

4. The head-up display of claim 1 wherein said optical combiner comprises a reflection hologram supported by a windshield.

5. The head-up display of claim 4 wherein said polarizer comprises a P-polarizer.

6. The head-up display of claim 1 wherein said image source produces imaging illumination that is randomly polarized.

7. The head-up display of claim 6 wherein said image source comprises a vacuum fluorescent display.

8. The head-up display of claim 1 wherein said image source comprises a liquid crystal display.

9. The head-up display of claim 1 wherein said image source produces imaging illumination that is spectrally narrow.

10. The head-up display of claim 1 wherein said optical combiner comprises a windshield surface.

11. The head-up display of claim 10 wherein said polarizer comprises an S-polarizer.

* * * * *